United States Patent [19]

Gaskins

[11] 4,338,912
[45] Jul. 13, 1982

[54] OUTDOOR COOKING GRILL

[76] Inventor: Thomas Gaskins, Palmdale, Fla. 33944

[21] Appl. No.: 165,947

[22] Filed: Jul. 2, 1980

[51] Int. Cl.³ .......................... F24B 3/00; F24C 1/16; F47J 37/00
[52] U.S. Cl. ............................... 126/25 A; 126/9 R; 126/9 B; 126/29; 126/25 R
[58] Field of Search .......... 24/3 J, 3 L, 3 M, 201 HE, 24/201 L, 211 R, 243 K, 251; 126/25 A, 9 R, 25 R, 29, 30, 9 A, 9 B

[56] References Cited

U.S. PATENT DOCUMENTS

| 2,201,756 | 5/1940 | Avetta | 126/25 R |
|---|---|---|---|
| 2,295,685 | 9/1942 | Place | 24/243 R |
| 2,441,190 | 5/1948 | Fuller | 126/9 R X |
| 2,591,001 | 4/1952 | Olpe | 24/251 |
| 2,821,187 | 1/1958 | Tescula | 126/25 R |
| 2,828,733 | 4/1958 | Moore, Jr. | 126/25 R |
| 2,891,465 | 6/1959 | Rogge | 126/25 A |
| 2,946,275 | 7/1960 | Compton | 126/25 A |
| 3,276,351 | 10/1966 | Sundholm | 126/25 R X |
| 3,572,313 | 3/1971 | Ciancaglini | 126/25 R X |
| 4,095,315 | 1/1978 | McGahee | 24/201 |
| 4,133,335 | 1/1979 | Malafouris | 126/25 A |
| 4,201,125 | 5/1980 | Ellis | 126/25 A |

*Primary Examiner*—Larry Jones
*Attorney, Agent, or Firm*—Nathaniel A. Humphries

[57] ABSTRACT

An outdoor cooking grill has a U-shaped support stand comprising a horizontal carrier beam attached to the upper ends of vertical legs; first and second fire grills are suspended from the horizontal carrier beam and are held together by clip connectors so that food, such as meat, is retained between the grill members. First and second fire grates are provided on opposite sides of the grill with each fire grate having one side supported by brackets on the vertical post with the other side being supported by a movable grate connected at an opposite end to an anchor block resting on the ground. Movement of the anchor block toward or away from the grill serves to position the fire grate inwardly or outwardly with respect to the food on the grate to adjust the cooking rate.

1 Claim, 6 Drawing Figures

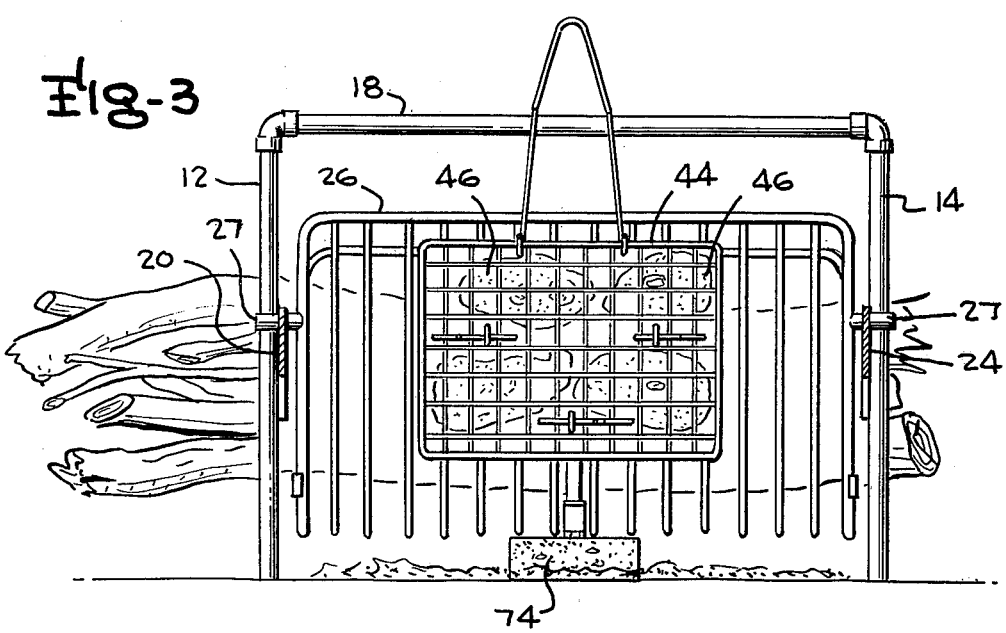
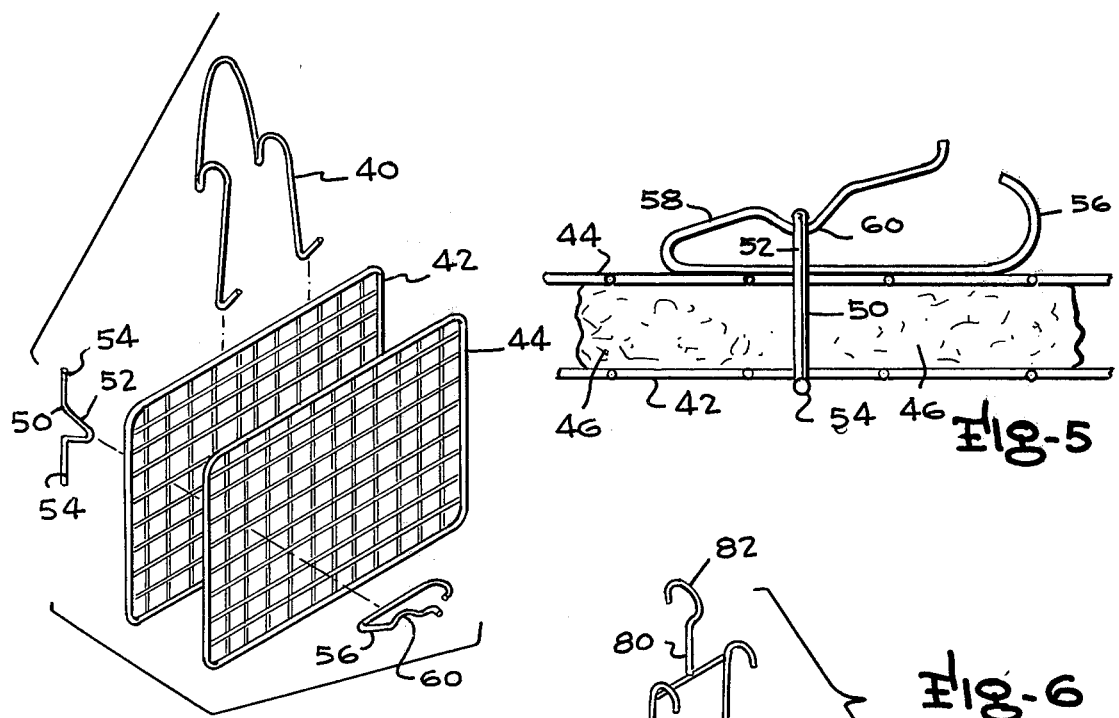
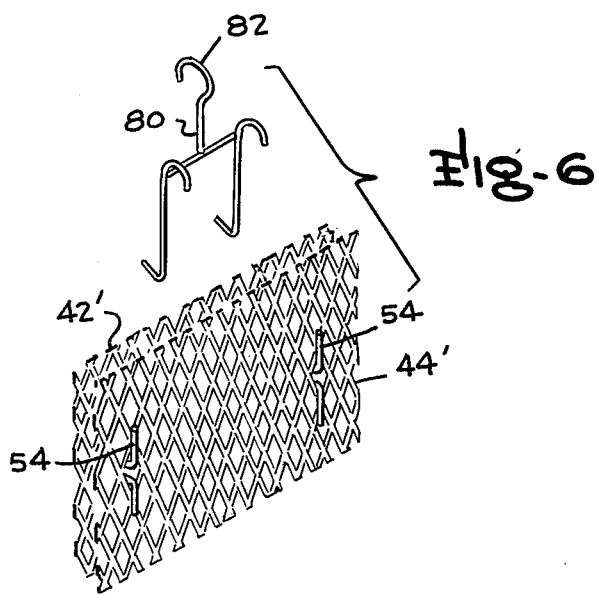

OUTDOOR COOKING GRILL

BACKGROUND OF THE INVENTION

This invention is in the field of cooking equipment and is more particularly directed to the field of outdoor barbecue grills employing an open fire providing a bed of coals for effecting the cooking function.

Outdoor cooking grills of the type employing a fire pan over which a food supporting rack is mounted are well-known and widely used. One shortcoming of grills of the foregoing type is that when they are used to cook meat, such as steaks or the like, it is necessary that the meat be turned over for both sides to be properly cooked; this fact lengthens the cooking time and involves some inconvenience to the user. It is also desirable that the rate at which the cooking function progresses be adjustable in order to avoid burning of the food while permitting completion of the cooking within a reasonable time. Conventional barbecue grills of the foregoing type have consequently employed a variety of adjustable members for effecting a raising or lowering of the food supporting grill so as to vary the distance of the food on the grill from the members providing the cooking heat. Frequently such adjusting means becomes difficult to operate as a result of corrosion or the presence of ashes or other material in the moving parts which impairs the necessary movement of the parts. Accidents consequently frequently occur as a result of attempts to adjust faulty grill lifting or lowering components during the cooking operation.

Other prior art devices have proposed to employ vertical grill members positioned between fire grates for cooking food suspended between the grates on both sides simultaneously. However, such prior art devices have not achieved widespread acceptance due to a variety of factors including the difficulty of positioning food of varying thicknesses between the fire grate components and an inability to accurately adjust the fire grates with respect to the food holding components to provide for an optimum cooking rate. The best known prior art comprises U.S. Pat. Nos. 1,650,181; 1,701,033; 2,335,217; 2,441,190; 2,456,397; 2,690,171; 2,821,187; 2,923,229; 3,091,170; 3,140,651; 3,237,621; 3,276,351; 3,302,555; 3,611,912; 3,742,838; and 4,120,237.

Therefore, it is the primary object of this invention to provide a new and improved outdoor grill-type cooking means.

A further object of this invention is the provision of new and improved grill-type cooking means capable of holding food products of varying thicknesses without any need for adjustment.

Yet another object of this invention is the provision of new and improved grill-type cooking means having new and improved means for adjusting the position of the fire bed with respect to the food being cooked.

SUMMARY OF THE INVENTION

Achievement of the foregoing objects of this invention is enabled by the preferred embodiment which comprises stand means consisting of first and second vertical posts each comprising a pipe connected at its upper end to a horizontal support or carrier beam. The horizontal support beam comprises a pipe which supports a food carrier comprising first and second planar food grills between which a steak or other food item or the like is held in position. Spring clip means hold the grill member in position during the cooking of the food with the grill members being suspended from the horizontal support beam by a wire bail. First and second fire grates are provided along opposite sides of the food supporting means with each fire grate having one side supported by a bracket attached to each of the vertical post members. The opposite side of the fire grate is supported by a support brace rod hingedly connected on one end to an anchor block resting on the ground and pivotally connected on an opposite end to the fire grate so that inward and outward movement of the anchor block with respect to the vertical post etc. serves to move the fire grate inwardly and outwardly with respect to the food grills to permit adjustment of the cooking grate for both sides of the food.

A better understanding of the preferred embodiment will be achieved when the following detailed description is considered in conjunction with the apended drawings in which like reference numerals are used for the same elements in the different figures.

BRIEF DESCRIPTION OF THE DRAWINGS

FIG. 3 is a sectional view taken along lines 3—3 of FIG. 2;
FIG. 4 is an exploded perspective view of the food supporting grill members and associated clip connector members;
FIG. 5 is an enlarged plan view of the clip connector means for connecting the grill components which are shown in section;
and
FIG. 6 is a perspective view of alternative grill component means and associated hanger means for suspending same.

DESCRIPTION OF THE PREFERRED EMBODIMENTS

Figure 1:
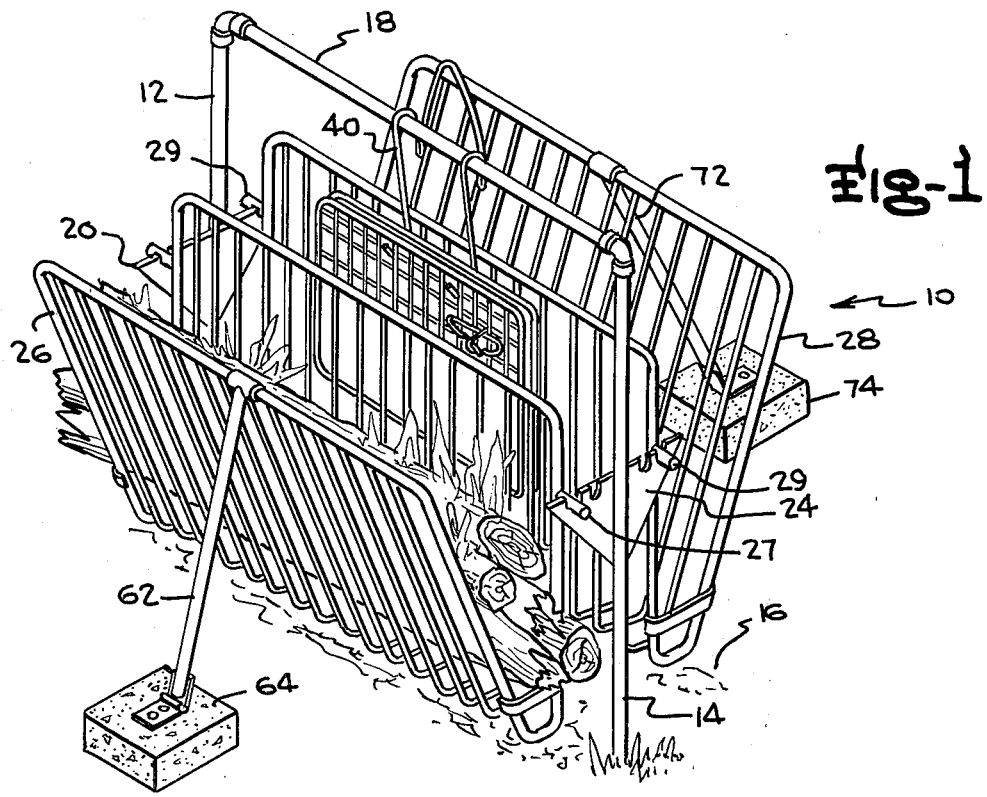
FIG. 1 is a perspective of the preferred embodiment.
Figure 2:
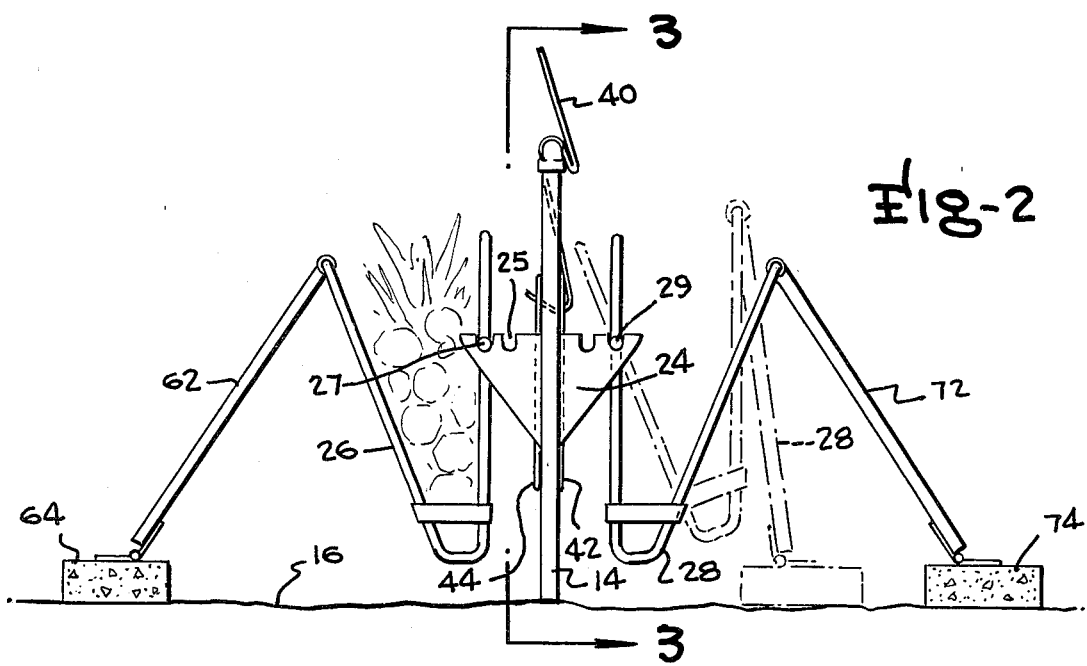
FIG. 2 is an end elevation view thereof.

FIG. 1 illustrates the preferred embodiment 10 of the subject invention which comprises a U-shaped vertically extending food holding means consisting of first and second vertically extending post members 12 and 14 embedded in the ground 16 or other supporting surface with a horizontal support or carrier beam 18 extending between the upper ends of the vertical post members 12 and 14. Support brackets 20 and 24 are respectively fixedly connected to the vertical posts 12 and 14 for providing support for one side of vertical V-shaped first and second fire grates 26 and 28. Support lugs 27 are provided on opposite ends of the fire grate 26 to rest in a selected one of slots 25 in the support brackets 20 and 24 while the second fire grate 28 similarly has support lugs 29 selectively positionable in aligned slots 25 on the opposite sides of the brackets 20 and 24. Horizontal carrier beam 18 provides support for a bail means 40 from which food carrier means comprising first and second wire grill panels 42 and 44 of identical configuration. In use, food portions 46 are positioned between the wire grill panels and a plurality of spring clip connectors are connected to the panels 42 and 44 to urge them against opposite sides of the food to snugly hold the food in position.

The clip connectors each comprise a holding clip 50 having a V-shaped through portion 52 dimensioned to extend through the openings in the wire grill and retainer arms 54 for limiting the movement of the holding clip and a spring clip 56 engageable with the opposite grill panel with a spring arm 58 having an indentation 60 engageable with the outer end extremity of the through portion 52 as best shown in FIG. 5. When the clip members are connected in the manner illustrated in FIG. 5, the spring arm 58 urges the V-shaped holding clip 50 against its associated grill panel so that the grill panels 42 and 44 are urged upwardly toward each other to clampingly hold the food portion 46 in an obvious manner. It will be observed that the geometry of the spring clip 56 is such as to permit it to be used with food portions of various thicknesses over a substantial thickness range.

Support for the outer side of first fire grate 26 is provided by a support brace 62 hingedly connected at its lower end to a movable anchor block 64 and hingedly connected at its upper end to the first fire grate. Similarly, the outer portion of the second fire grate 28 is supported by a support brace 72 having its lower end connected to a movable anchor block 74. It will be observed that the anchor block 74 can be moved inwardly, such as to the dotted line position, to effectively pivot the second fire grate 28 to the dotted line position to adjust the position of the fire contained therein with respect to the food portions 46 suspended on bail 40 between the first and second fire grates. Further adjustment can be achieved by positioning of the support lugs 29 in selected ones of the slots 25. First fire grate 26 is similarly adjustable.

FIG. 6 illustrates a second embodiment of the grill panels in which the grill panels comprise elements 42' and 44' having a "diamond" wire configuration. This embodiment also employs an alternative hanger 80 having a hook 82 positionable over the horizontal carrier beam 18 in an obvious manner. The wire panel 42', 44' are held in position by the clip members 50 and 56 in the same manner as are panels 42 and 44.

Additionally, it should be understood that it is not essential that the support brackets 20 and 24 be employed for supporting the fire grates 26 and 28 in that the lower ends of the fire grates can simply rest on the ground. Alternatively, the lower ends of the fire grates can be positioned on elevated supporting members such as bricks or the like which are on the ground so ashes will fall from the grates to the ground to avoid blocking of the flow of air into the lower portions of the grates. When the grates are used in this manner, the anchor blocks 64, 74 can be moved inwardly and outwardly to pivot the grates about their lower end terminations to move the upper portions of the grates toward or away from the food portions that are being cooked. It should also be understood that the vertically extending post members 12 and 14 could be constructed separately from the carrier beam 18 which would be supported by outwardly extending pins provided in selected ones of a series of apertures provided in the post members at discrete vertically spaced distances from each other so that the carrier beam could be positioned at a desired elevation. Also, the carrier beam 18 could be provided so that it is longer than the spacing between the vertical posts 12 and 14 so as to extend on both ends to provide a hanging area for food portions that have already been cooked or for those portions that are awaiting cooking.

The foregoing are exemplary of the type of modifications that will be obvious to a person of skill in the art and it should be understood that numerous other modifications will undoubtedly occur to those of skill in the art and the spirit and scope of the invention should consequently be limited solely by the appended claims.

Thus, it will be seen that the present invention permits an easy adjustment of the fire grates with respect to the food products being cooked without any danger of accident or injury being present. Moreover, the present invention is uniquely reliable and rugged and is capable of usage with food portions of varying thicknesses due to the unique characteristics of the clip connector members. While numerous modifications of the preferred embodiment will undoubtedly occur to those of skill in the art, it should be understood that the spirit and scope of the invention is to be limited solely by the appended claims.

I claim:

1. A cooking apparatus comprising a support member, vertically extending food holding means connected to and supported by said support member for holding food to be cooked;

first and second V-shaped vertically extending fire grates positioned and pivotally supported on opposite sides of said food holding means for holding first and second cooking fires; and adjustment means for pivotally adjusting the position of the fire grates with respect to the food holding means;

wherein said food holding means comprises first and second vertically extending wire grill panels and clip connector means for detachably connecting said first and second wire grill panels for permitting food to be positioned between the grill panels for cooking and for constantly urging said first and second wire grill members toward each other through a substantial range of relative movement for permitting food portions of varying thicknesses to be retained in position between said grill panels;

wherein said connector means comprises a V-shaped holding clip having a through portion extending through openings in said first and second vertically extending wire grill panels and also having retainer arms limiting the extent of movement of the through portions in a first direction through said panels and a spring clip member having a spring arm engageable with said through portion for urging said first and second grill panels toward each other as a result of reactive force exerted between said V-shaped holding clip and said spring clip;

wherein said support member comprises first and second vertically extending post members and a horizontal carrier beam extending between and supported by said first and second vertically extending post members and additionally including carrier brackets on each of said vertically extending post members for partially supporting said first and second fire grates; and wherein said carrier brackets include open slots along an upper surface thereof, each of said grates including lug means selectively positionable in said open slots for adjusting the inward position of the fire grates with respect to the food holding means and support brace means connected to the outer side of said fire grates at an upper end and connected at a lower end to a movable ground engaging anchor block which can be moved inwardly or outwardly for adjusting the angular orientation of the fire grates with respect to the food carrier means.

* * * * *